United States Patent [19]

McCubbrey et al.

[11] Patent Number: 4,860,375

[45] Date of Patent: Aug. 22, 1989

[54] HIGH SPEED CELLULAR PROCESSING SYSTEM

[75] Inventors: David L. McCubbrey; Robert M. Lougheed, both of Ann Arbor, Mich.

[73] Assignee: Environmental Research Inst. of Michigan, Ann Arbor, Mich.

[21] Appl. No.: 837,770

[22] Filed: Mar. 10, 1986

[51] Int. Cl.[4] .............................................. G06K 9/54
[52] U.S. Cl. ....................................... 382/49; 382/27; 382/41
[58] Field of Search ............................. 382/41, 27, 49; 364/736, 715, 133, 140

[56] References Cited

U.S. PATENT DOCUMENTS

| | | | |
|---|---|---|---|
| 3,905,045 | 9/1975 | Nickel | 382/41 |
| 4,550,437 | 10/1985 | Kobayashi et al. | 382/41 |
| 4,574,394 | 3/1986 | Holsztynski et al. | 382/41 |
| 4,601,055 | 7/1986 | Kent | 382/41 |
| 4,667,295 | 5/1987 | Preston, Jr. | 382/41 |

Primary Examiner—Leo H. Boudreau
Assistant Examiner—Joseph Mancuso
Attorney, Agent, or Firm—Krass & Young

[57] ABSTRACT

A cellular processing system for analyzing an image comprising a matrix of points employs an image memory for storing digital data signals representative of each of the points, a plurality of special function processing units, each adapted to perform a specific operation on one or more images, and data bus means for selectively distributing image data from the image memory to one or more preselected function processors for processing in a cascaded fashion and returning the processed data signals back to image memory. The special function process units include a pipeline processor employing one or more programmable, substantially identical neighborhood transformation stages and an image combiner including means for performing arithmetic, logical, and conditional operations on one or more images.

13 Claims, 8 Drawing Sheets

HIGH SPEED CELLULAR PROCESSING SYSTEM

FIELD OF THE INVENTION

This invention relates to image analysis and, more particularly, to a cellular processing system which performs pattern recognition and analysis operations on one or more images represented by a matrix of digital signals.

BACKGROUND OF THE INVENTION

A wide variety of applications exist in which it would be desirable for a machine to automatically recognize, analyze, and/or classify patterns existing in images which have been sensed and converted to some sort of matrix of electrical signals. Some of the simpler problems, which have been implemented with at least limited success by machines, include the recognition of alphanumeric characters and recognition or counting of certain particles, such as blood cells. (see e.g. U.S. Pat. Nos. 3,846,754 to Oka; 3,196,398 to Baskin; 3,473,789 to Sharp; 3,761,876 to Flaherty; 3,278,704 to Slotnick, and 3,899,771 to Saraga et al.)

Elaborate programs have been written for general purpose computers to perform pattern analysis and classification. The limited success of the general purpose computer to perform pattern analysis and classification is due to the extremely long processing times to process images with a large number of data points.

In recent years, a number of special purpose processors have been developed which implement mathematical techniques applicable to data in the form of images in order to transform the data points in the image to determine some of the characteristics of patterns displayed in the initial image array. One such digital image processing apparatus is disclosed in U.S. Pat. No. 4,363,104, issued to Nussmeier. Nussmeier discloses a video imaging system wherein the video image data, in the form of a matrix of points or picture elements (pixels) is multiplexed serially to each of a plurality of image processing modules. Each of the image processing modules contains its own bus control means for selecting the particular data words which lie in the assigned image region to be processed by that module, and memory means for storing the image data to be utilized by that particular module. While the Nussmeier system allows for parallel processing of portions of the entire image by each of the processing modules, a relatively complex hierarchical bussing system must be employed at the processor level. In addition, each of the processing modules must have its own bus controller, memory, internal data bus, and internal address bus in addition to the hardware which comprises the processing means.

U.S. Pat. No. 4,167,728, issued to Sternberg, and assigned to the assignee of the present invention, discloses a class of image analyzer processors employing a serial chain of substantially identical neighborhood transformation stages. The image data is serially shifted through a neighborhood extraction portion at each stage for sequentially accessing all the neighborhoods in the image matrix. Depending upon the states of the pixels contained in the neighborhood extraction portion, certain transformations are performed and the transformed output is passed on to the input of the succeeding stage. A central controller, which is coupled to all of the stages, defines all of the particular transformation analyses to be performed in each of the stages. The serial processor system disclosed in this patent and in related patent Nos. 4,174,514, 4,322,716, 4,395,699, and 4,414,685, obviate the need for the hardware and complex architecture required of the Nussmeier system, yet provide for cascaded transformation of a complete image by serially routing the image data stream from one stage to the next in the chain.

One object of the present invention is to provide an integrated high speed support system for the pipeline processing systems of the type disclosed in the Sternberg patents which allows for rapid routing of image data to and from the pipeline within the system.

Another object of the present invention is to provide an integrated image processing system of the type including the capability of combining or operating on a plurality of images simultaneously.

Another object of the present invention is to provide an image processing system capable of performing a programmed sequence of one or more different image processing operations on a serial stream of digital image data during a single pass through the system.

Another object of the present invention is to provide means for programming each of the pipeline processing stages in the pipeline for each processing cycle without materially affecting total processing time.

Another object of the present invention is to provide means for controlling the simultaneous flow of image data for multiple images through the processing system.

SUMMARY OF THE INVENTION

The present invention involves a cellular processing system for analyzing an image represented by a series of digital electronic signals corresponding to a matrix of points constituting the image. The system includes image memory, for storing images and controlling the circulation of data through the system during image processing, a pipeline image processor for performing preprogrammed transformations on a serial stream of digital data signals which make up the points in the matrix defining the image, an image combiner for performing image-to-image comparisons, arithmetic, and logical operations upon one or more images, and a pipeline controller (port) for routing image data from image memory to the pipeline processor and control and programming of each of the stages in the processor. The components of the system are interconnected by a series of unidirectional data paths which provide for routing of the image data signals from image memory to the image combiner and/or the pipeline processor (through the pipeline port), from the pipeline processor to the combiner, and from the output of the combiner back to image memory. The image memory, pipeline port and image combiner are typically connected to a host system bus which allows the image processing system to interface with a plurality of peripheral devices such as CPU and memory devices (found in a host general purpose digital computer), camera and video analog interface, and color cathode ray tube display.

Image memory provides both a source and repository for the digital images. The images are represented by a matrix of pixels wherein each pixel is represented by a digital data signal. These digital data signals may correspond to pixels from a two-dimensional or three-dimensional image.

A serial stream of digital data signals representing the pixels from a particular image are routed along one of a plurality of image source paths at a rate of 10 megapixels per second to either the image combiner or to the pipeline port for processing by the image combiner or pipeline processor respectively. Pixel data output from the pipeline processor is routed into the combiner where it may be operated on with corresponding points in another image that has been supplied from image memory along a different source path. The pixel data output from the image combiner is then routed along one of a plurality of image destination paths back to image memory where it is input into a particular area of memory by a write region controller.

The pipeline port receives pixel data from image memory and routes it to the first of the neighborhood processing stages in the pipeline processor. In addition, the pipeline port contains local storage for a number of neighborhood processing stage programs. These programs are loaded by the port into the appropriate neighborhood processing stage according to program instructions received from the host computer. After each of the programs has been loaded into each of the neighborhood processing stages, the pipeline port routes pixels and control signals from one of the image source paths into the pipeline for processing.

The pipeline image processor includes one or more substantially identical neighborhood transformation stages, each stage being operative to transform the digital signal for each pixel into a new value according to a preprogrammed transformation criteria. Each pixel is subjected to a sequence of time-discrete transformations, the transformed value of the pixel being determined by the initial values of a finite group of pixels composing its neighborhood. Thus, a single neighborhood processing stage can perform a transformation on a serial stream of pixels for an entire image. The output stream of transformed pixel data is then routed to the next neighborhood processing stage in the chain and so forth until the pixel data has gone through each of the neighborhood processing stages in the pipeline. It should be noted that each of the substantially identical neighborhood processing stages is individually programmable so that a particular transformation scheme may be undertaken at each stage.

The image combiner includes means for performing arithmetic, logical, and conditional operations on pairs of images. The combiner contains two calculation units, each of which can be used for performing image-to-image operations simultaneously. The pixel data is received by the image combiner from the output of the last active neighborhood processing stage in the pipeline processor or directly from image memory via one of the image source paths. Thus, for example, an image received from the pipeline processor can be combined with an image received from memory or two images received from memory can be combined without either of them going through the pipeline processor. In the preferred embodiment, the image combiner performs these operations on the image data at a rate of 10 megapixels per second.

It should be noted that when one of the images is provided from the pipeline processor, the pixel data for the second image will be suitably delayed (by an amount equal to the total pipeline processing time for the first stream of pixel data) in order to allow pixel data for corresponding points on each of the images to meet at the same time in the combiner. Pixel data output from the combiner is then routed along one of a plurality of image destination paths where it is then written to image memory. In this manner, a serial stream of pixel data representing a single image may undergo processing in the pipeline processor and image combining operations in the image combiner during a single pass through the system. Thus, as will be appreciated by those skilled in the art, the improved architecture of the present invention eliminates much of the time-consuming iterative circulation of pixel data between image processing operations that was characteristic of prior art systems.

Each of the transformed images contained in image memory may pass through the above described cycle a number of times in order to undergo repeated processing by the pipeline processor and/or in combination with another image in the image combiner in order to achieve the desired level of processing.

BRIEF DESCRIPTION OF THE DRAWINGS

These and other objects and advantages of the present invention will become more apparent upon reading the following specification and by reference to the drawings in which.

DETAILED DESCRIPTION OF THE PREFERRED EMBODIMENT

A. System Overview

Figure 1:
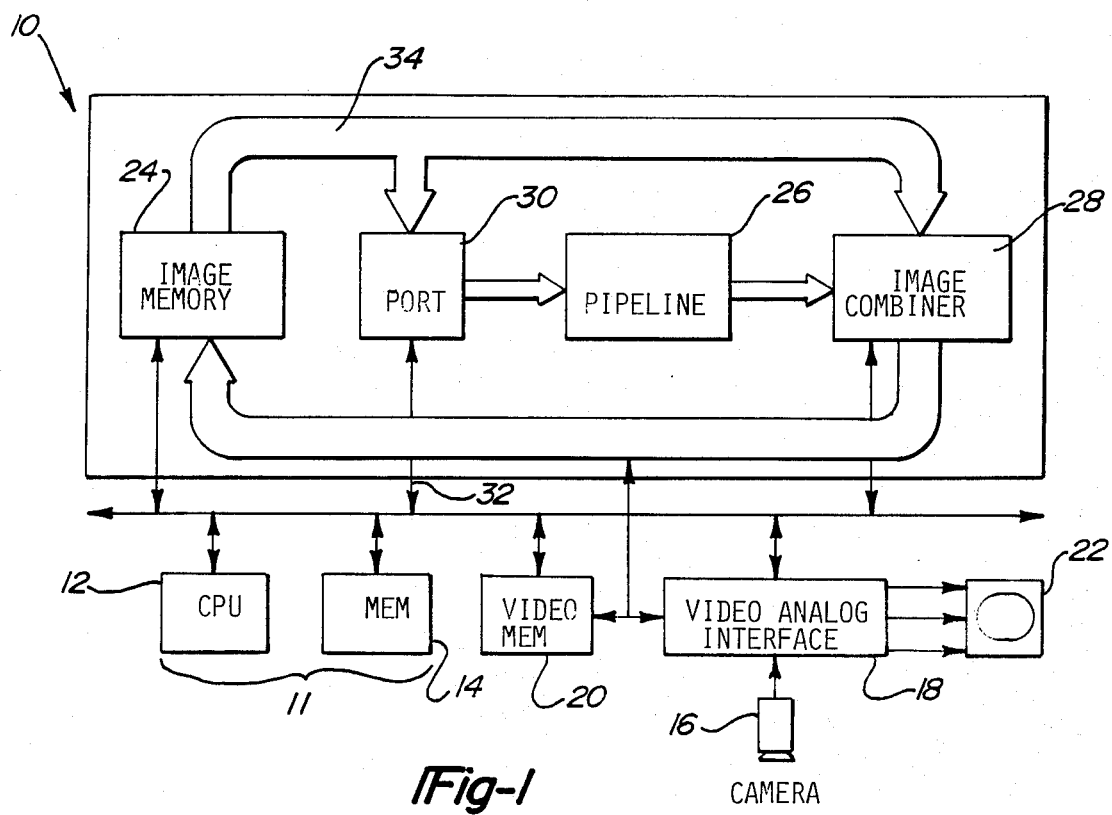
FIG. 1 is a block diagram of the major components of the system of the preferred embodiment of the present invention.

FIG. 1 shows the interconnection of the major components of the cellular processing system of the present invention. The system 10 interfaces with a plurality of peripheral devices such as a central processing unit (CPU) 12 and memory 14, each typically located in a general purpose digital computer (referred to as the "host system 11"), a video camera 16, video analog interface 18, video memory 20 and cathode ray tube display 22.

The system 10 includes high speed image memory 24 for storing images received from the host system 11 in the form of a series of digital data signals, each digital data signal corresponding to a pixel in the image, a pipeline processor 26 preferably consisting of one or more substantially identical neighborhood processing stages which perform a preprogrammed 3×3 neighborhood transformation on incoming raster scan ordered pixels, and an image combiner 28 for performing image-to-image comparison, arithmetic, and logical operations on pixel data corresponding to one or more images received from image memory 24 or from the output of the pipeline processor 26.

The system 10 also preferably includes a pipeline port 30 which automatically programs each of the neighborhood processing stages in the pipeline processor 26 prior to processing an image, and routes pixel data and the appropriate control signals into the first stage of the pipeline processor 26 to begin processing.

Each of the above described components of the system is interconnected by a plurality of data paths 34 for routing the digital image data from the image memory 24 to the pipeline processor 26 (through the port 30) and/or to the image combiner 28 and back to image memory 24.

B. Data Path (Bus) Structure

Figure 2:
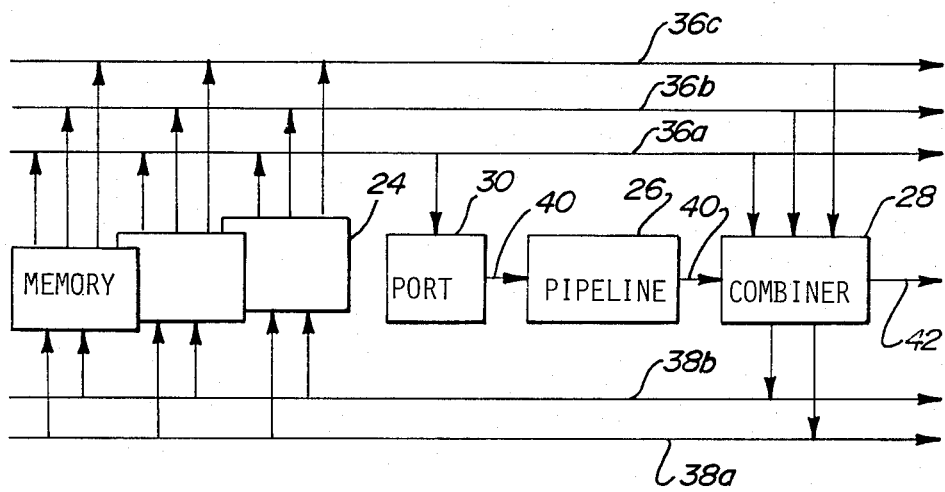
FIG. 2 is a block diagram of the preferred embodiment of the present invention showing the image source and destination paths connecting the major components.

Referring to FIG. 2, the cellular processing system 10 of the present invention preferably contains three types of image data paths 34—image memory source paths 36 A-C, image memory destinations paths 38A and 38B, and the pipeline processor data path 40. The image memory source paths 36 A-C and destination paths 38A-B are unidirectional multiple access buses. The pipeline processor data path 40 is a daisy chained bus in which data for a given neighborhood processing stage is received from the previous neighborhood processing stage and, after processing, passed to the next processing stage. Each of the image memory source paths 36 A-C and destination paths 38A-B contains 11 lines and is capable of parallel synchronized data transfer of 8 bits of data, one odd-parity bit and two control bits at a rate of 10 mega-pixels per second. Each of the image memory source paths 36A-C and destination paths 38A-B may transfer image data independently of or in synchronization with other image source or destination paths.

It should be noted that the bus structure of the preferred embodiment allows for routing of pixel data from the image memory 24 along each of three source paths 36 A-C to the combiner. Image memory source path 36A can also be utilized to route pixel data from the image memory 24 to the pipeline port 30 for use in the pipeline processor 26. After processing by the pipeline processor 26 and/or the combiner 28, pixel data is then routed along either of the image memory destination paths 38A or 38B back to image memory 24. It will be appreciated by those skilled in the art that the unique architecture of the present invention significantly increases the processing speed of the image data by providing means for performing more than one image processing operation (i.e., both neighborhood processing and image combining operations) in a single pass of the data through the system.

The data path structure of the present invention is designed to accommodate additional future special function processing units which may be added to perform additional image processing operations upon the pixel data. These devices may be added to the existing pipeline processor and image combiner units along pipeline data path 42 and connected to image source and destination paths 36A-C and 38A-B in a manner similar to the image combiner. In this manner, a serial stream of pixel data may be routed along selected source paths and/or the pipeline data path to undergo one or more selected image processing operations during a single pass through the system.

C. Image Memory

Referring to FIGS. 3A-3D, image memory 24 consists of one or more planes or cards 42-46 which serve as both a source and destination of digital images for the system. Once the processing of a particular image has begun, the image memory 24 is in control, supplying a continuous stream of pixels to be processed and saving the result.

Each of the image memory cards 42-46 accommodates 36 64K×1 memory devices, providing a total memory capacity of ¼ Megabyte per card. This allows for a 512×512 pixel image to be stored on one image memory card.

Figure 3A:
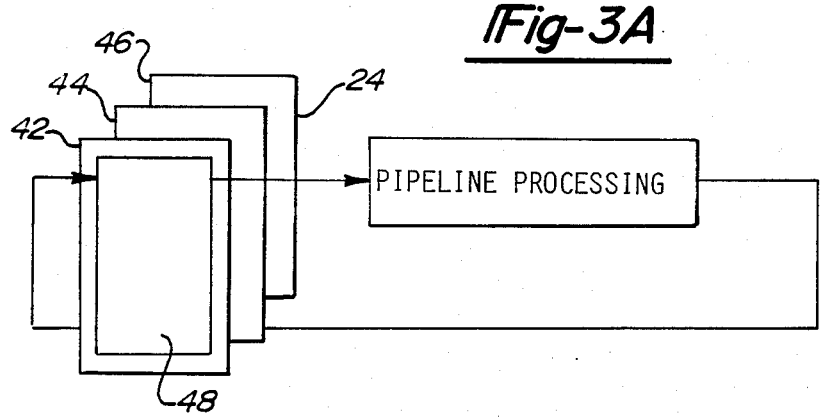
FIG. 3 (A-D) diagrammatically illustrates an example of memory windowing and sub-region processing.
Figure 3B:
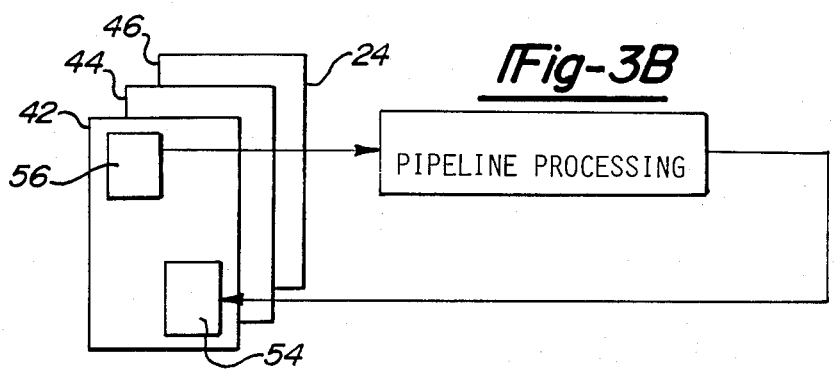
Figure 3C:
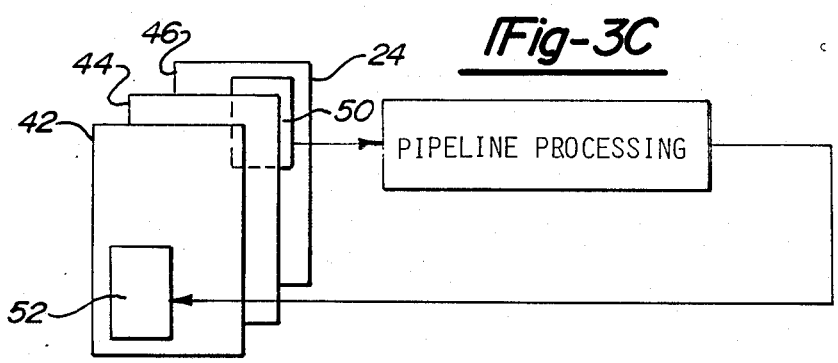
Figure 3D:
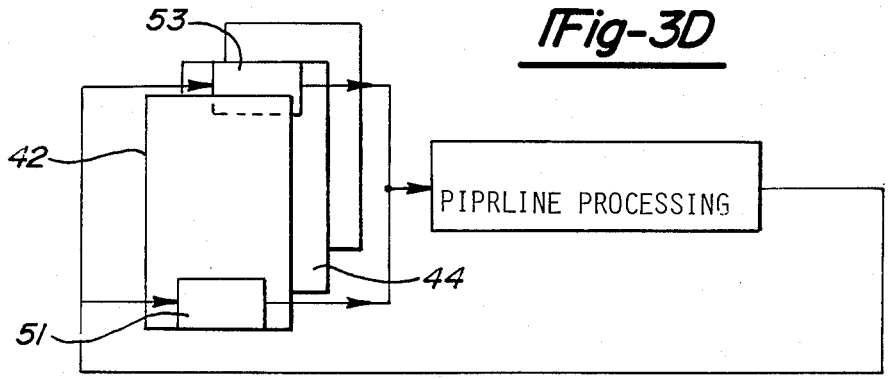

While FIG. 3A shows utilization of a single memory card 42 as both the source and destination region for a complete image 48, the system also supports image windowing. Windowing is the ability to define a sub-image region within the standard 512×512 pixel image and only access pixels within this area of interest. For example, a sub-image region 56 may be described on a particular memory card and accessed as the image source region for a particular processing cycle. The image resulting from the processing may then be returned to the same memory card in a different sub-image region 54. (See FIG. 3B) It should be noted that the sub-image source region 50 can be located on a different memory card 46 than the sub-image destination region 52, located on memory card 42. (See FIG. 3C)

Similarly, a single image may reside on more than one memory card. (See FIG. 3D) For example, a first portion of a particular image or sub-image 51 may be described on one memory card 42 with the remaining portion of that image or sub-image 53 located on a different card 44. As will be described hereinafter in greater detail, the read region controller (shown as 62 in FIG. 4) for each of the image memory cards 42-46 is provided with a delayed start register which may be programmed to delay the start of processing on that particular image memory card for a specified period of time after a system start command is initiated.

In order to read image data corresponding to an image that is contained on more than one card, the delayed start register on card 44 containing the image data for the second portion of the image 53 will be programmed to delay its start for the amount of time that it will take to read the data corresponding to the first part of the image 51 from image memory card 42. The appropriate control register on each of the image memory cards 42 and 44 will identify the same image source path for each of the image portions 51 and 53. A system start signal will start the reading of the first portion of the image 51 contained on card 42 onto the specified image source path with the second portion of the image data 53 being read from card 44 onto the same image source path immediately following the first portion of the image. In this manner, the serial stream of data on the image source path appears (as it should) as one complete image. A 1K×1K image can thus be processed with the standard 512×512 cards if there are four cards utilized in the system.

A total of 1 megabyte per card may be accommodated by simply replacing the 64K×1 memory devices with 256K×1 memory devices without changing the design of the preferred embodiment described herein. 1

Megabyte per card memory would allow for a 1024×1024 pixel image to be stored on a single card.

Figure 4:
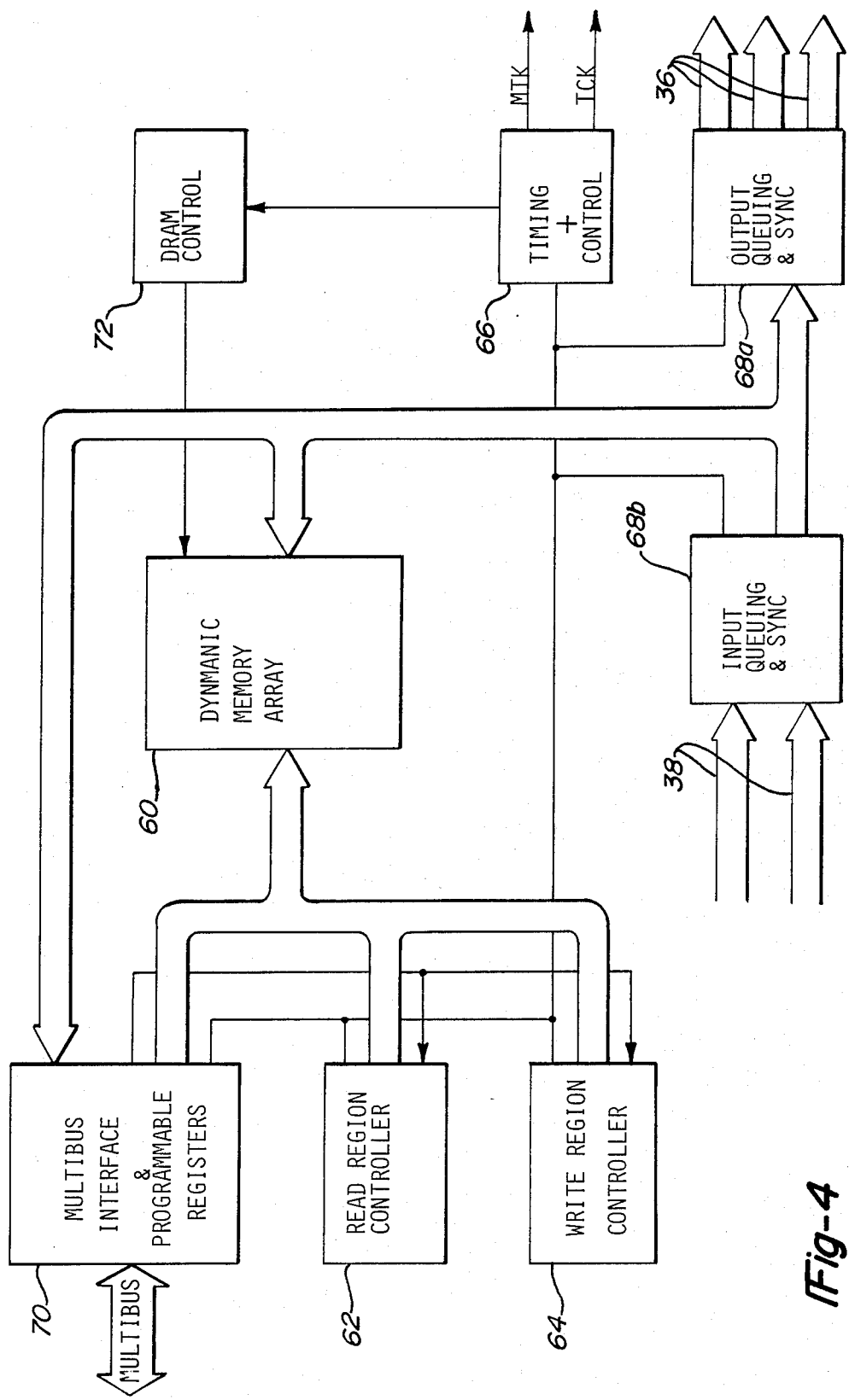
FIG. 4 is a block diagram of the logic components of image memory.

Referring to FIG. 4, the image memory of the preferred embodiment of the invention is partitioned into seven functional blocks-the image memory array 60, read region controller 62, write region controller 64, timing and control 66, input and output queueing and synchronization 68A-B, DRAM controller 72 and host system bus interface and status and control registers 70.

The memory array 60 is implemented with thirty-six conventional 64K×1 dynamic random access memory devices. These devices are accessed using nibble mode addressing which significantly increases the memory's bandwidth capability. Nibble mode allows up to four sequential bits to be accessed within one memory cycle, providing over twice the normal bandwidth.

In the preferred embodiment, the read region controller 62 is a programmable address generator (shown as 400 in FIG. 5) used to automatically access the image memory array 60 and output image bytes on one of the three image source paths 36A-C. Part number AMD2932, manufactured by Advanced Micro Devices, Sunnyvale, Calif., is utilized in the preferred embodiment.

Along with the data bytes, two control signals are output to qualify the image data. They are data input valid (DIV), which indicates when valid data is present, and line input start (LIS), which indicates that the current byte is the first pixel in the scan line.

Figure 5:
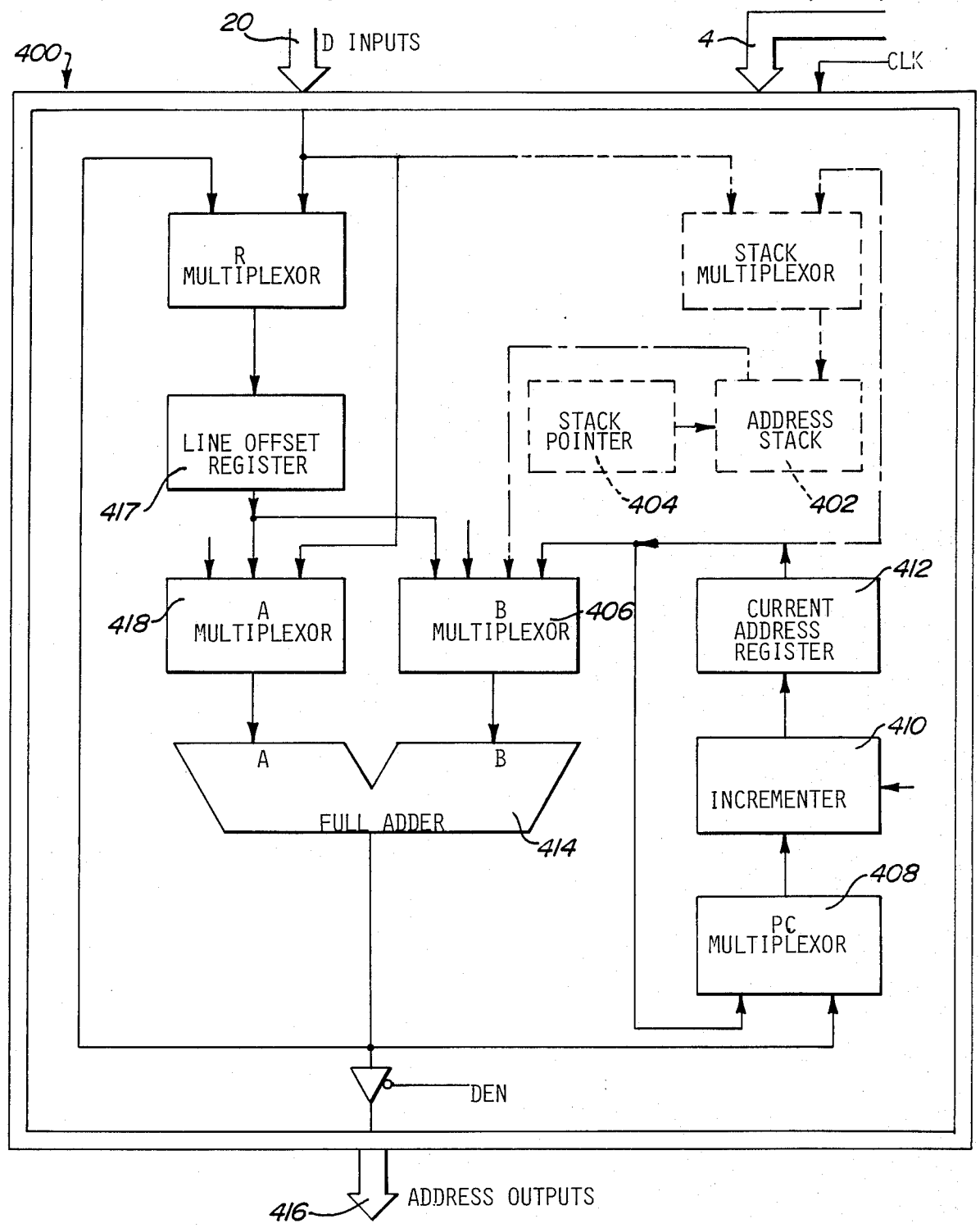
FIG. 5 is a schematic of the micro-program address generator.

The region of sub-region (window) boundaries 48-56 are completely programmable and are set up by the host 11 prior to pixel processing. Referring to FIGURE 5, the starting address location of the image or subimage region boundaries 48-56 is initially loaded into the address stack 402 in the programmable address generator 400. Upon receiving a command to read (or write) a particular region from memory by the host 11, a stack pointer 404 is set indicating the location of the start address for that region in the address stack 402. The value of the start address is then routed through multiplexor 408 and is stored in the current address register 412 as the current address. This current address is then sent to multiplexor 406 where it is routed through the full adder 414 to the address output 416. The current address routed from the full adder 414 is also sent back to multiplexor 408 where it is ultimately incremented by the incrementor 410, loaded as the new value in the current address register 412 and, after the appropriate time interval, sent to multiplexor 406, into the adder 414 and output from the address generator 400 at 416 as the next address. This cycle of incrementing the current address to form the new current address is repeated for a number of times equal to the line length. At this point, a command is issued to the address generator 400 to load the line offset, equal to the number of memory locations between the end of each line in a region and the beginning of the next line in that region, from the line offset register 417 into multiplexor 418 where it is routed to the adder 414 and is added to the current starting address. As will be appreciated by those skilled in the art, the result of this addition is equal to the address of the first memory location in the next line in the region. This address is then sent out of the generator at 416 and also routed back to multiplexor 408 where the cycle continues for the next line. Thus, by initially loading the programmable address generator 400 with the appropriate start address and line offset for a particular region, automatic read or write access to that region can be obtained by sending the appropriate control signals to the read or write region controllers 62 and 64, shown in FIG. 4.

The write region controller 64 also utilizes a programmable address generator of the type shown in FIG. 5 and described above. It is used to automatically access image memory and input image bytes from one of two image destination busses 38A-B.

The address generators located in each of the read region controller 62 and write region controller 64, can be programmed to perform a resizing of a particular image. For example, a downsizing (down sampling) of an image can be performed which reduces the number of pixels per line and the number of lines in the image. If a 2:1 reduction is performed, then only every other pixel in the even (or odd) numbered lines is retained, yielding an image which has one quarter as many pixels.

To expand an image, an "up sampling" can be performed. In this case, the destination region will be larger than the source region. The source pixels are scattered regularly into the destination image. The new, larger image is then closed with a sphere (or cube, pyramid, etc.) via a sequence of neighborhood operations to "fill in" between the old, scattered pixels.

Referring again to FIG. 4, each image memory card 42-46 in the system has a 10 megahertz crystal oscillator which is capable of providing the system time base by driving the master clock (MCK) directly as part of the timing and control function 66. However, the clock source on only one memory card, the "master" memory card, is enabled to act as the system clock source. The master clock (MCK), transfer clock (TCK), and memory refresh signal are driven on the master memory card and received by the other memory cards so that each of the memory cards in the system operates in synchronization.

Every 12.8 microseconds, a memory refresh cycle is performed on each of the memory cards 42-46 in response to the memory refresh signal generated by the timing and control function 66 on the master memory card. The dynamic random access memory devices utilized in the preferred embodiment have an automatic CAS (column access strobe) before RAS (row access strobe) refresh capability so that no refresh address is required for each of the cards 42-46. The refresh cycle will last exactly 400 nanoseconds and occurs simultaneously in each of the individual memory cards to maintain synchronization.

The timing and control function 66 contained on each of the memory cards 42-46 is also capable of generating a transfer clock (TCK) signal. Again, this signal is only generated by the memory card designated as the master memory, with each of the remaining memory cards receiving this transfer clock signal. This signal is utilized by each of the memory cards to clock the input and output of data along the image destination paths 38 and image source paths 36 through the input queue 68b and output queue 68a respectively. Again, it should be noted that the execution of read or write cycles by each of the individual image memory cards 42-46 is performed in synchronization because a single transfer clock signal, generated by the master memory card, is utilized by all of the memory cards 42-46.

As previously mentioned, image data is buffered and packed/unpacked on both the input to, and output from memory. For example, when a memory read cycle is performed, 8 bytes are produced. The output queueing and synchronization function 68A queues the image data received during the read cycle and clocks the data out one byte at a time at a 10 megahertz rate. Similarly, input queueing and synchronization function 68B includes the queueing, one byte at a time, of image data received from the image destination paths 38 until an 8-byte group is accumulated so that a write to the memory array 60 can be performed.

The host system interface 70 provides a communication channel for the host CPU 11 to program the region descripter and mode registers in the read region controller 62 and write region controller 64, to monitor the status and control register and to directly access image memory 60. The status and control register (not shown) located in the host system interface 70 is a 16 bit register and is the only readable memory control register. In the preferred embodiment, the lower 8 bits are for mode control and are both readable and writable. The upper 8 bits are for status monitoring and are read only. Thus, when this register is read, both the current mode and status information is available. Thus, the interface allows the host CPU 12 or other host master devices, such as the port 30, to control memory operation through the status and control register located in the host system interface 70 and the registers located in the read region and write region controllers 62 and 64.

The image memory has three basic operating modes-idle, circulating and image acquire. Each of these modes is selected by the host 11.

The memory is in idle mode any time it is not actively circulating pixels or acquiring an image from the host 11. The system will default to this mode and will automatically return to idle mode after processing pixels or image acquisition.

The circulating mode occurs when the control register in the interface 70 is programmed for image circulation and a system start command is detected. This is the image processing mode of driving the image source paths 36A-C and image destination paths as previously described. When an image processing cycle is complete, memory reverts to idle mode when the HALT signal is asserted by the port 30.

Image acquire mode allows the memory to read and store video images received directly from a high speed peripheral such as the video analog interface 18 along the destination data path at video rates. The memory can be programmed to accept interlaced or noninterlaced video formats.

The DRAM control 72 contains logic for receiving the timing signals from the system clock and generating signals for controlling the nibble mode read, nibble mode write, host memory access and memory refresh operations in the memory array 60.

D. Pipeline Port

Referring to FIG. 2, the pipeline port 30 provides entry to the start of the pipeline processor 26 and performs three major functions—control and programming of the neighborhood processing stages in the pipeline processor 26, routing of image data and control signals into the pipeline processor 26 during image processing, and system control and system status reporting.

Control and programming of the neighborhood processing stages takes place prior to the image processing cycle which uses the pipeline processor 26. Thus, as will be appreciated by those skilled in the art, it is desirable to complete programming of the pipeline processor 26 as rapidly as possible. To this end, the port 30 contains a command queue, shown as element 84 in FIG. 6. The command queue 84, preferably a high speed static RAM, can be loaded with control commands and stage program data for the next cycle while the current image processing cycle is in progress. The command queue 84 can store up to 8192 16-bit words of data. When the current cycle is over, the queue 84 is unloaded at 10 megabytes per second to program the stages. Thus, the queue allows the relatively slow host system bus 32 to transfer program data during processing.

During image processing, the port 30 routes pixel data (preferably in the form of 8-bit words) and control signals from image source path 36A to the start of the pipeline processor 26 (FIG. 2). In addition, the port 30 acts a central control point for initiating, monitoring, and halting high speed system operations via control signals received from the host on the system bus 32 (FIG. 1). It contains logic for issuing the system START, HALT, and RESET signals, monitors and system BUSY signal and all error condition signals.

Figure 6:
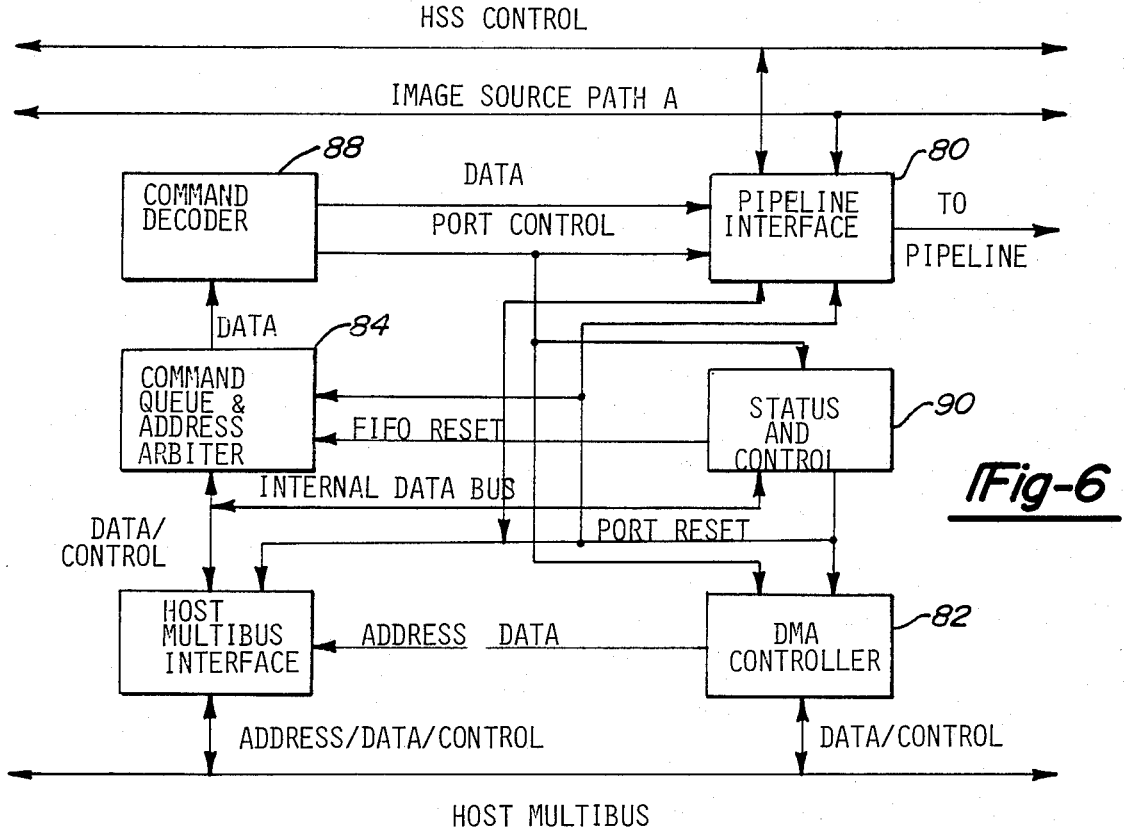
FIG. 6 is a block diagram of the logic components of the pipeline controller.

FIG. 6 shows the six major logic sections which make up the port 30. These sections are the pipeline interface 80, the direct memory access (DMA) controller 82, the command queue 84 and queue address generator and arbiter (not shown), the command decoder 88, the control/status logic module 90, and the host multibus interface 92.

The pipeline interface 80 provides the electrical interface to the first stage of the pipeline processor 26. The pipeline interface 80 also preferably includes latency adjustment logic. This logic ensures that the total latency of the pipeline processor 26 is a multiple of eight transfer clocks, as required by the memory accessing mechanism employed in the image memory 24. For a first image routed to the port 30 and the pipeline processor 26, and a second image routed directly to the combiner 28, to reach the combiner 28 at the same time, transmission of the second image from image memory 24 must be delayed by specific number of ticks of the system transfer clock to allow for the first image's processing time. The formula for total pipeline latency is: port latency, 2 clocks+(number of active processing stages × data line length + 15) clocks +(number of deactivated processing stages×2) clocks. After calculating this latency, an appropriate latency adjustment should be programmed by the user to bring the total to a multiple of the image line length. This latency adjustment is then stored in a register in the pipeline interface 80. Delay means in the pipeline interface 80, preferably in the form of conventional memory devices such as part number TMM 2018, manufactured by Toshiba Corporation, then delay the incoming image data from 1 to 2048 transfer clocks according to the value stored in the latency adjustment register.

The DMA controller 82 provides means for high speed loading of the port command queue 84. A two channel DMA controller, the AM9516, manufactured by Advanced Micro Devices, Sunnyvale, Calif., and its associated support circuitry are utilized in the preferred embodiment of the present invention. In normal operation, channel 1 will be programmed to move port commands, stage commands, and stage program data into the port command queue 84 to prepare for image processing in the pipeline processor 26. Channel 2 of the DMA controller 82 may be programmed independently for other user defined tasks. In particular, it could be programmed for loading the control registers in the image memory and the image combiner 28, or transferring images to or from the image memory 24.

The command queue 84 is preferably a high speed static RAM that can store up to 8192 16-bit words of data, such as part number TMM 2018, manufactured by Toshiba Corporation. This queue is loaded by the host computer 11 or by the DMA controller 82, and is unloaded by command decoder 88.

A queue address generator/arbiter (not shown) generates addresses for the command queue 84 and controls whether command decoder 88 or the host 11 has access at any given time. Access to the command queue 84 by either the command decoder 88 or the host 11 (through the DMA controller 82) is determined by the queue address generator/arbiter on a word-by-word basis. For example, the queue address generator/arbiter determines at any point in time whether a request for access to the command queue 84 has been issued by the DMA controller 82 or the command decoder 88. If both the DMA controller 82 and the command decoder 88 have requested access of the command queue 84, the address generator/arbiter grants access to the DMA controller 82. After the DMA controller 82 has loaded one word into the command queue 84, the address generator/arbiter then allows the command decoder 88 to remove one word from the command queue 84. Access is then alternated on a word-by-word basis between the DMA controller 82 and the command decoder 88 until the address generator/arbiter receives either one or no requests for access to the command queue 84. This rapidly alternating access appears to allow for "simultaneous" loading (by the host 11) and emptying (by the command decoder 88) of the command queue 84.

Overall port 30 and system 10 operation is driven by the sequence of control words located within the command queue 84. The command decoder 88 contains the appropriate logic for unloading the control words contained in the command queue 84, processing these words, and causing appropriate actions within the port 30, and throughout the system 10 to occur.

It should be noted that the control words loaded into the command queue 84 may be either be port commands or stage program data. Each of the port commands are preferably 16-bit values. The following commands are utilized in the preferred embodiment:

(1) Issue Stage Control-this command causes the command decoder 88 to clock the operand field of this word into the beginning of the pipeline processor 26. The operand field includes eight data bits and three input control flags. Sequences of stage control words are used to issue stage commands, download program data, and in general, control the flow of information within the pipeline processor 26.

(2) Start DMA-this command causes the command decoder 88 to activate the hardware DMA request line to a specific DMA channel. Thus, DMA operation by a particular channel can be initiated at predetermined times automatically. This capability is primarily used when a sequence of image processing cycles is to be performed entirely without the host CPU 12 intervention.

(3) Interrupt Host-this command causes the host interrupt request bit to be set by the command decoder 88. If these interrupts are not masked, an interrupt is issued to the host computer.

(4) Start Block [execution count] this command defines the beginning of a block of commands in the command queue 84 which are to be repeatedly executed. The parameter [execution count] is loaded into a counter and a location of the next command in the queue is saved for later recall.

(5) End Block and Repeat-this command marks the end of the current repeat block and implements actual repeat function. The execution count loaded by the start block command is incremented and the command decoder 88 branches to the command after the last start block command to repeat the cycle. When the execution count expires, the command decoder 88 continues with the command after the end block command in the command queue 84.

(6) Start Image Processing Cycle-the command decoder 88 command initiates an image processing cycle by causing the SYSTEM START signal to be 20 issued.

(7) Enter Data Mode-this command places the logic in the command decoder 88 in DATA MODE. In this mode, the command decoder 88 interprets a predefined number (defined via command 8) of subsequent entries as stage program data. Each program data entry is clocked into the pipeline's data input with the DATA INPUT VALID (DIV) control signal asserted. When the predefined number of bytes have been sent, the command decoder 88 changes from data mode back to program mode automatically.

(8) Set Data Count-this command loads a counter which determines the number of bytes received from the command queue 84 which are to be interpreted as stage program data.

(9) Clear Event Flags-the Event Flags specified in the data field are cleared by this command.

(10) Wait for Event Flags-the command decoder 88 will not fetch new entries from the command queue 84 until the specified Event Flag(s) are set. The Event flag(s) are:

(a) Image Processing Done-this flag is automatically cleared at the start of an image processing cycle and set upon completion;

(b) DMA #1 Done-this flag is cleared whenever a "start DMA #1" command is executed, and is set by the DMA controller's 82 channel 1 "end-of-process" signal at the completion of a data transfer sequence;

(c) DMA #2 done-this flag is cleared whenever a "start DMA #2" command is executed, and is set by the DMA controller 82 channel 2 "end-of-process" signal at the completion of a data transfer sequence;

(d) Host Flag #1-this flag is set or cleared by the command decoder 88 by writing bit 4 of the port status register; and (e) Host Flag #2-this flag is set or cleared by the command decoder 88 by writing bit 5 of the port status register.

It should be noted that any of the above described flag(s) can be set by the host 11 and/or the DMA controller 82. The Clear Event Flag(s) and Wait for Event Flag(s) instructions are provided to support synchronization with the two channels in the DMA controller 82 or external events. For example, the host can set a host event flag to indicate that an image memory has a new image to be processed. If the command decoder 88 had been waiting for that flag, it would then clear it and proceed with an image processing operation. As in another example, if the second channel in the DMA controller 82 were used to automatically load the system's control registers, waiting for "DMA #2 Done" would ensure that image processing would not start prematurely.

(11) Halt-the command decoder 88 logic is deactivated by this command. Any new command entries loaded by the Halt to the command queue 84 will simply accumulate until the decoder is reactivated. It should be noted that this command does not halt image processing operations.

The control/status logic 90 contains a plurality of registers which are directly accessible by the host 11 for controlling and monitoring the overall actions of the port 30 and the rest of the system 10. In the preferred embodiment, then 16-bit registers are utilized in the following manner:

(1) System status and control - the high byte of this location contains read-only system status bits, the low byte contains status bits and control bits writable by the host 11;

(2) Port status - this register gives information about port error conditions and status for the command decoder 88;

(3) Command queue input register (write only) - data is written to this register in order to place it at the end of the command queue 84;

(4) DMA controller address pointer - this register selects one of the DMA controller's 82 internal registers for access via the DMA controller data register (below);

(5) DMA controller data register - this location will access the internal register in the DMA controller 82 determined by the DMA controller address pointer (above);

(6) Latency adjustment - the lower twelve bits of this register correspond to the desired delay for incoming image data;

(7) Error counter (read-only) - the low byte of this word displays the high order 8 bits of the 24-bit error count register;

(8) Error counter (read-only) - this register displays the lower order 16 bits of the error count register;

(9) Pipeline input monitor (read-only) - this register displays the 11 bits of data which the port 30 supplies to the pipeline processor 26, and is used strictly for diagnostic purposes;

(10) Command queue monitor (read-only) - this register displays the output of the command queue 84.

The internal timing/control logic synchronizes and generates control signals for each of the various logic sections 80-90 in the port 30.

E. Pipeline Processor

Figure 7:
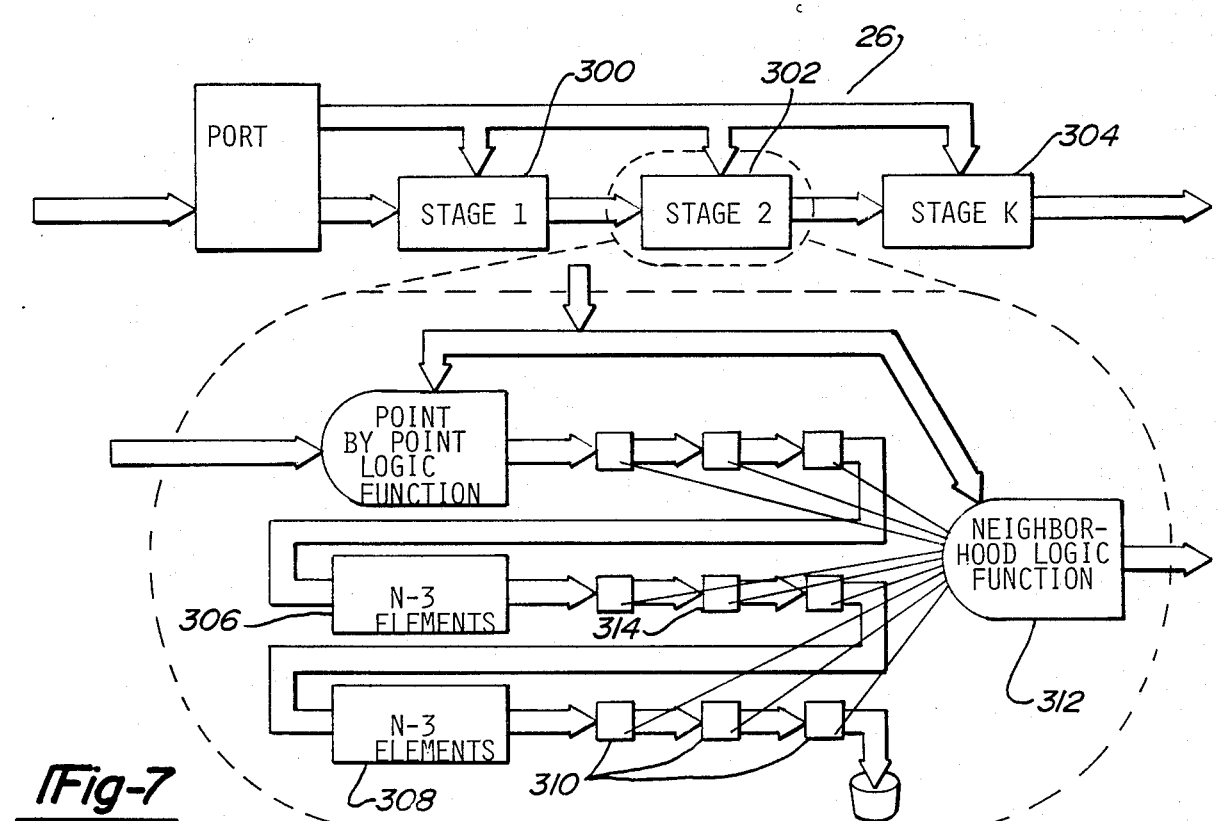
FIG. 7 is a block diagram of a preferred embodiment of the pipeline image processor.

Referring to FIG. 7, the pipeline processor 26 consists of one or more neighborhood transformation stages 300-304. The neighborhood transformation stages 300-304 are substantially identical and are arranged in a serial chain. The port 30 supplies a serial stream of image data to the first stage 300 in the chain where the data is processed and output to the next stage 302 in the chain.

The function of each of these stages 300-304 is to execute a single transformation function on a serial stream of data representing an entire image. Memory delays 306 and 308 within the stage 302 store contiguous scan lines of data while latch registers 310 hold neighborhood states which constitute the input of a neighborhood logic module 312. It should be noted that, in the preferred embodiment, nine latch registers are utilized and are positioned to disclose the values of a central pixel at 314 and each of its eight neighboring pixels at a discrete time interval. The values located in each of the latch registers 310 are then provided as input to a neighborhood logic module 312 which analyzes these values and modifies one or more of the pixels according to a preprogrammed criteria. A single pixel, the center pixel in latch register 314, is the only pixel that may be modified during a single clock period.

Figure 8:
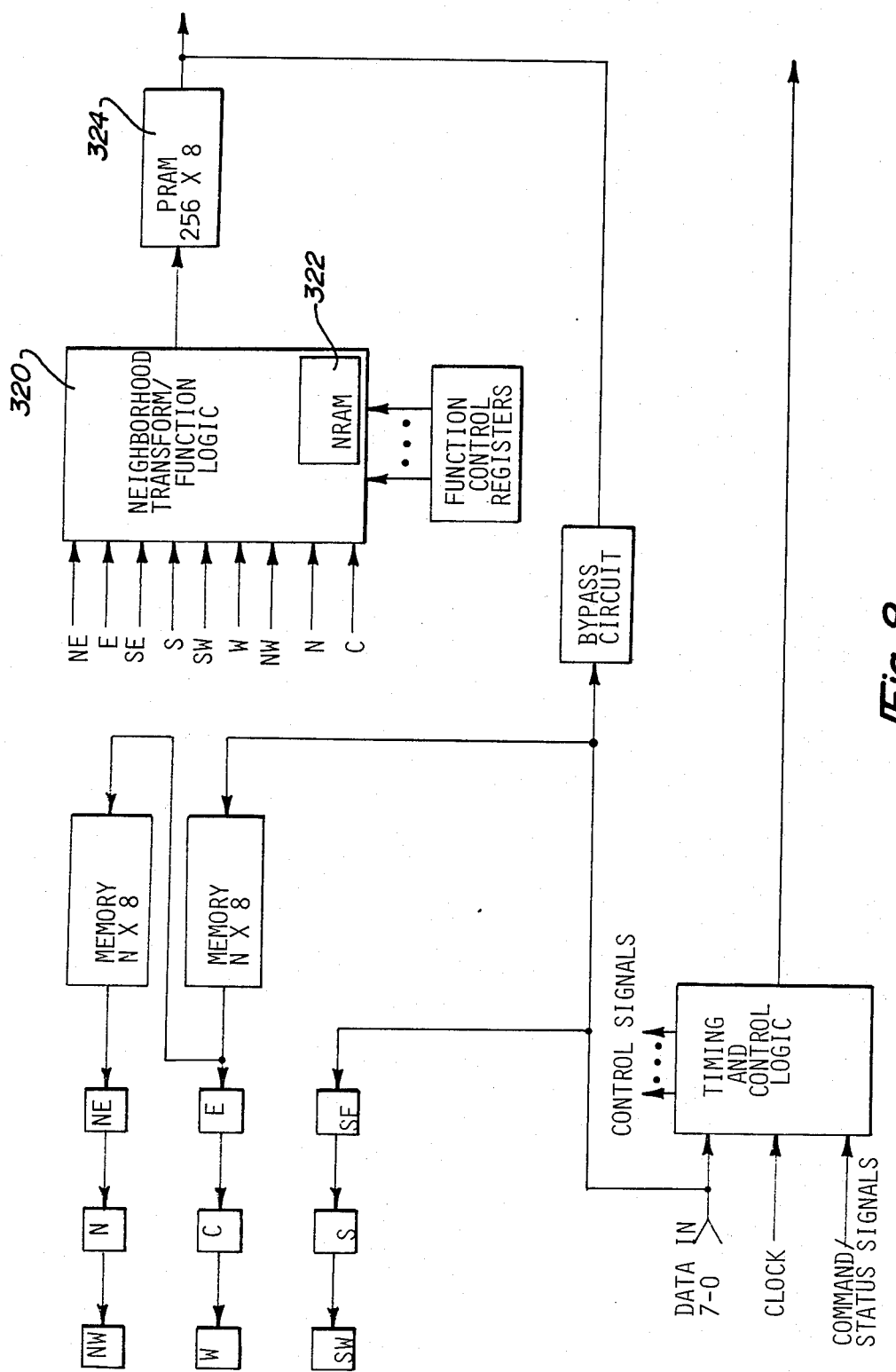
FIG. 8 is a conceptual diagram of one of the neighborhood processing stages utilized in the pipeline processor.

FIG. 8 is a conceptual block diagram of the image processing image and line storage memory contained in a particular stage. Three pixels of the current line are stored in the neighborhood window registers SE, S, and SW. Memory address hardware in this stage implements two equal programmable delays from 1 to 2,048 pixels. These delays are set equal to the line length of the image and reconstruct the $3 \times 3$ window by feeding the E, C, and W window registers with pixels delayed by one line and the NE, N, and W window registers with pixels delayed by two lines.

The 8 bit value from each register is fed into the neighborhood transform/function logic 320, in which transformations of the center pixel C are calculated. In many cases these transformations are accomplished by employing a $512 \times 8$ look up table (NRAM) 322 to obtain a result. The transformation result is a function of the program which is loaded into the stage and the particular configuration of the 8 pixel values in the neighborhood. It should be noted that one possible result which may be obtained from the neighborhood transform/function block is to not modify the center pixels value at all.

Another transformational block the PRAM 324, may be programmed to perform pixel transformations which do not involve the pixels' neighbors. The PRAM 324 is preferably a $256 \times 8$ look-up table.

Other significant features and details of the pipeline processor 26 and its individual stages 300-304 can be obtained by referring to the aforementioned Sternberg patents, by referring to U.S. Pat. Nos. 4,290,049; 4,301,443; 4,369,430; 4,395,697; 4,395,698; 4,395,700; 4,398,176; and 4,442,543, and by referring to U.S. patent application Ser. Nos. 300,328; 378,358; 489,669; 419,259; and 583,662, each commonly assigned to the assignee of this application, the details of which are hereby incorporated in this Specification.

F. Image Combiner

Figure 9:
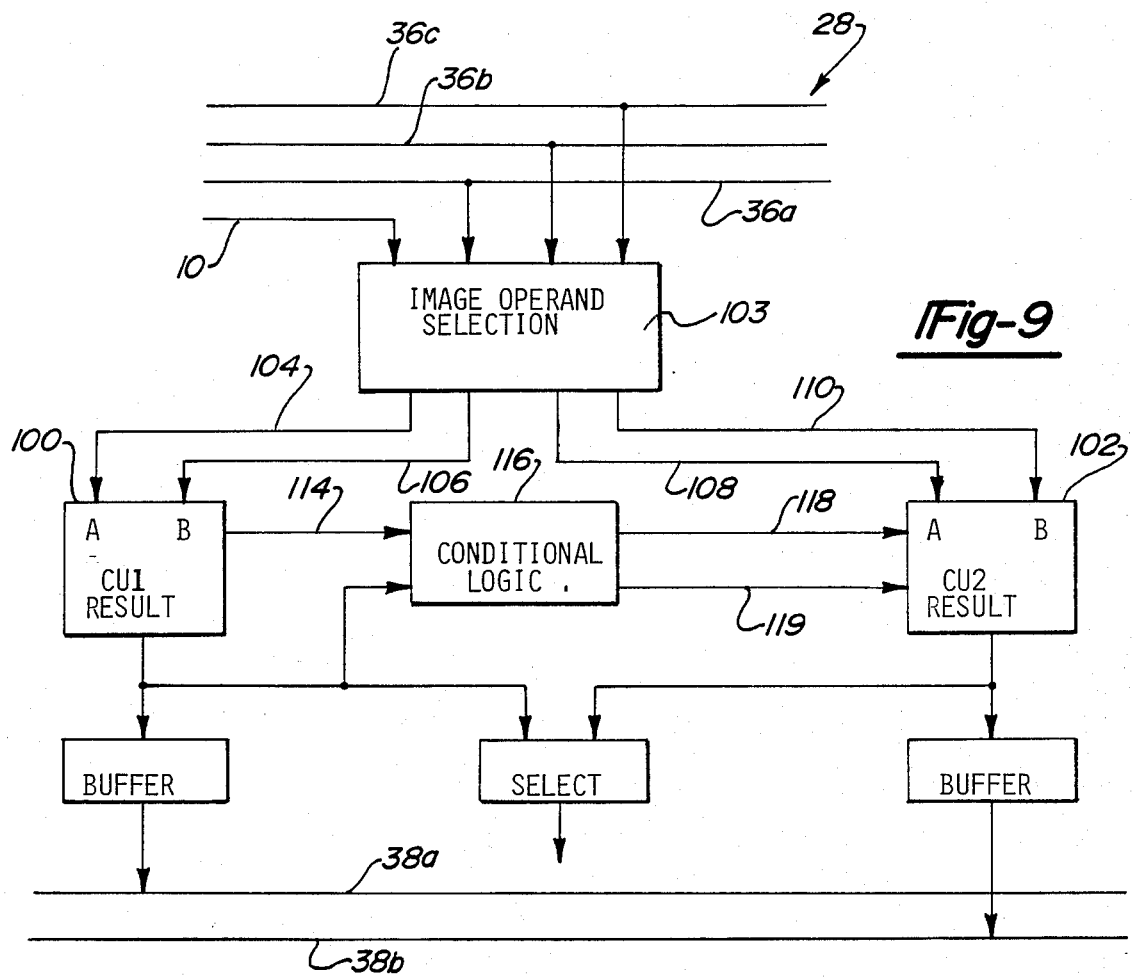
FIG. 9 is a block diagram of the principal logic component is and data paths of the image combiner.

Referring to FIG. 9, the image combiner 28 performs arithmetic, logical and conditional operations on one or more images. In the preferred embodiment, the image combiner 28 components are mounted on a single circuit board (designated 206 in FIG. 11). The image combiner 28 employs two calculation units, CU1 100 and CU2 102. Each of the calculation units 100 and 102 can be used for performing image-to-image operations. Results from CU1 100 are placed on image destination path 38A and results from CU2 102 are placed on image destination path 38B. If no combine operation on the output of the pipeline processor 26 is necessary, the image combiner 28 can be programmed to pass pipeline processor data directly to either of the image destination paths 38A or 38B.

As previously mentioned, when the pipeline input path 40 is used as an image source for any image operation in the combiner 28, an access delay equal to the total pipeline latency must be programmed into the memory read controller (62 in FIG. 4) to allow image source path 36B-C operands to "meet" the pipeline processor path 40 operand at the same time in the combiner 28.

Four indepedent operands can be generated using the image source paths 36A-C, the pipeline processor input path 40, or an eight-bit (programmable) constant. These image operands are then routed through the image operand selection multiplexor 103 to either of the calcuation units 100 or 102 via the four image operand paths 104–110. In the preferred embodiment, the source for each of the image operands routed along the paths 104, 106, and 108 can be any one of the following:

(1) pipeline processor path 40 or source path 36A;
(2) source path 36B;
(3) source path 36C; or
(4) a constant.

Similarly, the source for the image operands routed along path 110 to CU2 102 can be any one of the following:

(1) pipeline processor path 40 or source 36A;
(2) source path 36B;
(3) source path 36C; or
(4) a constant.

It should be noted that a pipeline diagnostic register (not shown) may be chosen as a source for image operand path 110 for supplying image operand data to CU2 102. In this manner, static testing can be performed directly without routing the data through the normal image source paths or processor inputs. Alternatively, various test factors can be supplied by and stored into the image memory for high speed testing.

Figure 10:
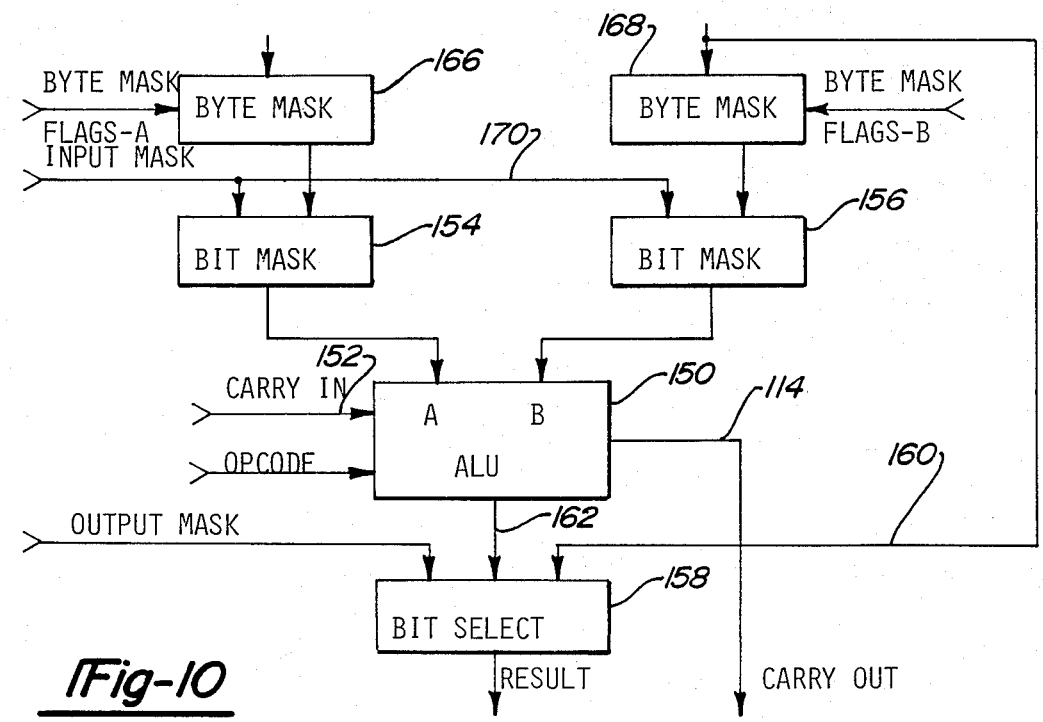
FIG. 10 is a block diagram of the major components and data paths of a calculation unit utilized in the image combiner.

The image combiner 28 performs six major functions-data routing, arithmetic, logical, conditional, masking and statistics gathering. In the next paragraphs, each of these functions will be described in greater detail using the following conventions: "A" and "B" refer to 8 bit image operands (pixels) presented at the A and B inputs of arithmetic/logic units (ALU) 150 within CU1 100 and CU2 102, as shown in FIGS. 9 and 10.

The ALU 150 in each of the calculation units 100–102 is capable of performing three basic arithmetic functions: $A+B+carry-in$, $A-B-1+carry-in$, and $B-A-1+carry-in$. The carry-in value, supplied on data path 152 to the ALU 150 in CU1 100 is programmable and may take on the value 0 or 1. The carry-in 152 to the ALU 150 utilized in CU2 102 may also be a programmable value, or may be the carry-out of the ALU 150 of CU1 100. As shown in FIG. 9, the carry-out from CU1 100 is routed via a data path 114 to a condition logic module 116 where it may then be routed on a data path 118 as the carry-in value to CU2 102. This utilization of the carry-out value of CU1 100 as a carry-in value of CU2 102 allows a pair of image operands to be treated as a 16 bit accumulator. In the preferred embodiment, the ALU 150 in each of the calculation units 100–102 is Part No. 74F382, manufactured by Fairchild Semiconductor, Inc.

CU1 100 and CU2 102 each have means for performing the following logical operations on image operands A and B:

(1) constant: all ones;
(2) constant: zero;
(3) A or B;
(4) A and B; and
(5) A xor B.

A pair of independent 8 bit mask registers 154 and 156, called input masks, operate on image operands A and B respectively, prior to routing of these operands into the ALU 150. These registers are loaded with a single input mask supplied on data path 170 and are typically used to select which bits within the operands will be active during processing by the ALU 150. The input masks 154 and 156 zero out bits in image operands A and B respectively, when the corresponding bits in the bit masks 154 and 156 are zero.

An output mask register 158 is similarly provided for operation upon the results received from the ALU 150. The output mask 158 selects a bit from image operand B supplied on data path 160 whenever the corresponding on the output mask is zero. Otherwise, the corresponding ALU result bit, supplied on path 162, is selected.

In addition, a pair of byte mask registers 166 and 168 are preferably provided for operating on image operands A and B prior to application of the bit masks 154 and 156. It should be noted that these byte masks allow for independent zeroing out or complementing of selected bits in the A and B operands. In contrast, bit masks 154 and 156 are each supplied with the same input mask value for operating on each of image operands A and B.

Referring again to FIG. 9, a conditional logic module 116 is provided which selectively determines which of two possible operations are to be performed by CU2 102, dependent upon several criteria. In the preferred embodiment, the conditional logic unit 116 can perform a true/false test based on any one of the following conditions or their complements.

(1) lower bound $\leq$ to CU1 output $\leq$ upper bound;
(2) CU1 carry-out; and
(3) CU1 carry-out and not (lower bound $\leq$ CU1 $\leq$ upper bound).

The "lower bound" and "upper bound" comperands listed above are independent 8 bit programmable values. Condition 1 test for output within a specified range. For example, if CU1 100 has been set to perform substraction (A−B) and the lower and upper bounds values are set at zero, then conditions 1, 2 and 3 can be interpreted as: $A=B$, $A\geq B$, and $A>B$ respectively. Choosing complemented conditions would give $A<>B$, $A<B$ and $A\geq B$. CU2 102 preferably has two control registers, each capable of controlling its operations. Depending upon the outcome of the above-described test performed in the conditional select data path 119 to CU2 102. This operation select signal enables one of the two control registers for operating on the current image operands. Thus, CU2 102 can be programmed to perform one of two alternative operations upon a pair of operands and A and B depending upon the result of the operations performed in CU1 100.

The conditional logic module 116 includes a 24 bit event counter from which simple statistical information on images and results of image operations can be obtained. At the start of an image operation, this counter is automatically set to 0. It can be set to increment until or whenever any of the above-described conditions occur.

G. Physical Layout of System

Figure 11:
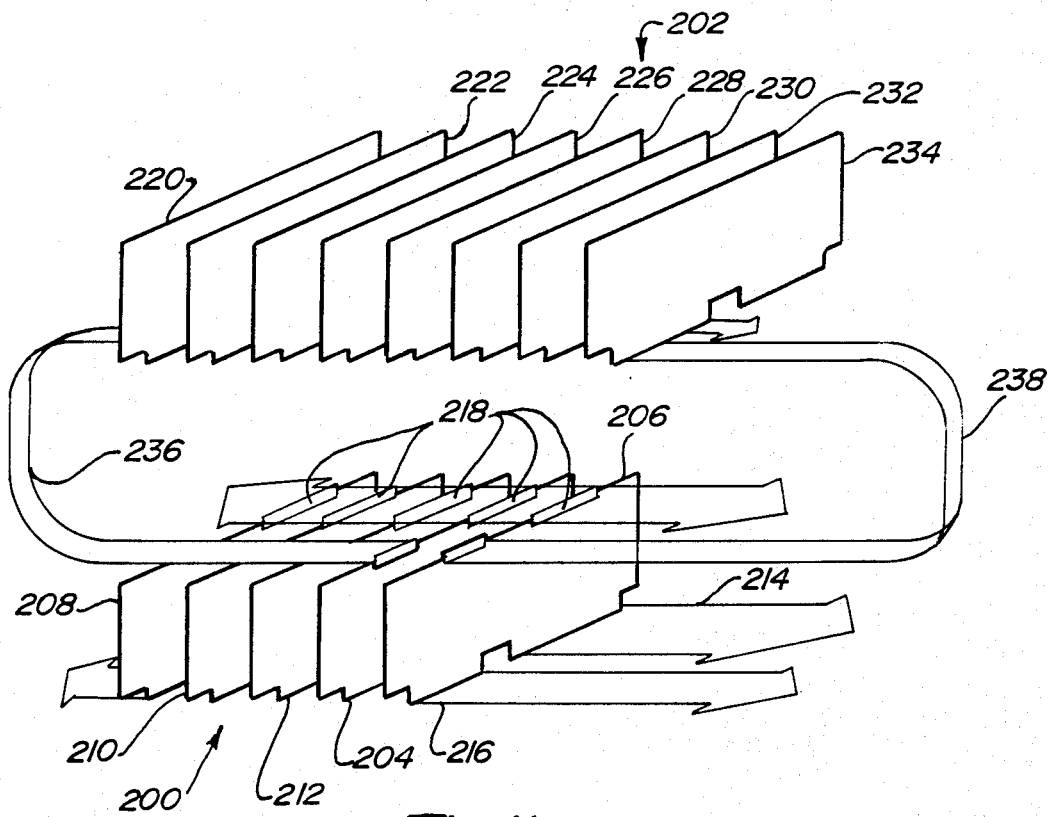
FIG. 11 illustrates a layout of the physical components of a preferred embodiment of the present invention.

Referring to FIG. 11, the system of the preferred embodiment is configured in two nests of circuit boards (cards) each preferably conforming to the Intel Corporation Multibus ® form factor. The system card nest generally referred to as 200 will accommodate up to 26 Multibus ® cards. The pipeline processor card nest generally referred to as 202, will accommodate up to 25 cards. The system nest 200, is preferably composed of port card 204, image combiner card 206 and image memory cards 208–212. This nest is preferably physically located on the same back plane as the host CPU 11. The system bus connector 214 also conforms with Intel Corporation's Multibus ® specifications and connects directly with the printed circuit back plane of the host CPU 11 (not shown). The image destination paths and system control signals are preferably implemented on a printed circuit back plane and are accessed through connector 216. The image source paths are implemented on 40 pin connectors 218 located on the top edges of the system cards 200. This signal path is bussed across each of the cards using a conventional 40 conductor flat ribbon type cable making a connection at each card.

The pipeline input is driven from the port card 204 and connects with the first stage card 220 in the pipeline processor nest 202 via a conventional 34 conductor ribbon cable 236. Each of the stage cards 220-234 in the pipeline processor nest uses a printed circuit back plane to but both input and output signals between the stages. Output from the last stage in the pipeline processor nest 202 is routed to the image combiner card 206 via pipeline return path 238.

We claim:

1. A cellular data processing system for analyzing one or more images each comprising a matrix of points, each point being represented by digital image data, said system comprising:

an image memory for storing an array of digital image data corresponding to at least one image;

a pipeline processor including at least one substantially identical neighborhood transformation stages, each neighborhood transformation stage having means for receiving a serial stream of digital image data corresponding to a raster scan of a matrix of points of a selected first input image and producing a serial stream of digital image data corresponding to a raster scan of the matrix of points of a transformed image, each point in said transformed image corresponding to said digital image data of a corresponding point of said selected first input image and a predetermined plurality of points of said selected first input image in the neighborhood of said corresponding point of said selected first input image;

an image combiner connected to said pipeline processor for performing a selected one of a predetermined set of arithmetic, logical and conditional operations for combining a serial stream of digital image data of a second selected input image with corresponding digital image data of said transformed image thereby forming a serial stream of digital image data corresponding to a combined image;

a source data bus connected to said image memory, said pipeline processor and said image combiner for supplying said serial stream of digital image data corresponding to said selected first input image from said image memory to said pipeline processor and said serial stream of digital image data corresponding to said selected second input image from said image memory to said image combiner; and a destination data bus connected to said image memory and said image combiner for supplying said serial stream of digital image data corresponding to said combined input image from said image combiner to said image memory for storage therein.

2. A cellular processing system according to claim 1 wherein the image memory includes:

a memory array for storing digital image data;
a read region control means for accessing the digital image data in a predefined sub-image region of said memory array, the predefined sub-image region occupying less than the entire portion of said memory array;

a means for outputting the digital iamge data in the predefined sub-image region as a serial stream to said source data bus for distributing digital image data to one or more of said pipeline processor and said image combiner.

3. The cellular processing system according to claim 2 wherein said read region control means in a programmable address generator.

4. A cellular processing system of claim 3 including control means for accessing preselected subimage regions of the image memory array on each of a plurality of circuit boards in a predetermined sequence to obtain a single image.

5. The cellular processing system of claim 4 wherein said read region control means includes a programmable address generator and a programmable delayed start register located on each of said plural circuit boards, whereby said programmable delayed start register on a particular circuit board can be programmed to delay the operation of the programmable address generator a predetermined amount of time.

6. A cellular image processing system according to claim 1 wherein the image memory includes:

a memory array for storing digital image data;
a write region control means for accessing a predefined sub-image region in said memory array, the predefined sub-image region occupying less than the entire portion of said memory array; and
an input means for placing a serial stream of digital signals received from said image combiner in the predefined sub-image region.

7. The cellular processing system according to claim 6 wherein said write region control means is a programmable address generator.

8. A cellular processing system according to claim 1 wherein said image memory is contained on one or more circuit boards.

9. The cellular processing system according to claim 1 wherein said image combiner includes:

a first calculation unit for performing arithmetic and logical operations on a pair of digital image data operands;
a second calculation unit for performing arithmetic and logical operations upon a pair of digital image data operands; and
a conditional logic unit operable to enable said second calculation unit to perform one of a plurality of alternative operations upon the pair of digital image data operands in said second calculation unit, said selected operation being a function of the output from said first calculation unit.

10. The cellular processing system of claim 9 wherein each of said first and second calculation units includes means for selectively disabling the processing of particular bits in said digital image data operands by said calculation unit such that the particular bits pass unmodified in value through said calculation unit.

11. A cellular data processing system for analyzing images wherein each image is made up of a matrix of points, each point being represented by digital image data, the system including:

a image memory for storing said digital image data representing the image points;
a neighborhood processing pipeline including a chain of a plurality of substantially identical neighborhood transformation stages, each stage adapted to perform a transformation selected from a predetermined set of transformations on a serial stream of digital image data representing a complete image, thereby forming a serial stream of digital image data representing a transformed image, said neighborhood transformation stages disposed in cascade to receive said serial stream of digital image data from a prior neighborhood transform stage;

a pipeline port including -
- means for programming each of the neighborhood transformation stages for performing a particular transformation on said digital image data,
- means for receiving a serial stream of digital image data representing an image from the image memory, and
- means for routing said serial stream of digital image data to the first stage neighborhood transformation stage of said neighborhood processing pipeline;

an image combiner including means for performing arithmetic, logical and conditional operations on serial streams of digital image data corresponding to a pair of images;

a first data bus means for routing digital image data corresponding to a first image from said image memory to said pipeline port;

a second data bus means for routing digital image data corresponding to a second image from said image memory to said image combiner;

a third data bus means for routing digital image data from the last of said neighborhood transformation stages, output by the neighborhood processing pipeline, to said image combiner; and a fourth data bus means for routing digital image data corresponding to a third image resulting from the output of said image combiner to said image memory.

12. The cellular data processing system of claim 11 wherein said pipeline port includes means for loading program data necessary for reprogramming one or more of said neighborhood transformation stages for a following image processing cycle concurrent with processing by said neighborhood transformation stages in a current image processing cycle.

13. A cellular processing system for analyzing an image comprising a matrix of points, each point being represented by digital image data, said system including:
- an image memory for storing said digital image data representing a plurality of images;
- a neighborhood pipeline processor adapted to receive a serial stream of digital image data, each data image data representing a point in a particular image, said neighborhood pipeline processor including means for transforming each of said digital image data into a new value as a function of the value of certain preselected neighboring points;
- a first data bus means for routing digital image data corresponding to a first image from said image memory to said neighborhood pipeline processor;
- an image combiner for performing arithmetic, logical, and conditional operations on a pair of images, the first of the pair of images being represented by a serial stream of digital image data received from the output of said neighborhood pipeline processor, and the second of the pair of images being represented by a serial stream of digital image data supplied from said image memory;
- a second data bus means for routing image data corresponding to said second image from said image memory to said image combiner;
- a third data bus means for routing the image data corresponding to said transformed first image from the output of said neighborhood pipeline processor to said image combiner; and
- a control means for delaying the routing of the digital image data representing said second image for a preselected interval of time to insure that the image data from said first image and said second image are received simultaneously at said image combiner.

* * * * *

UNITED STATES PATENT AND TRADEMARK OFFICE
CERTIFICATE OF CORRECTION

PATENT NO. : 4,860,375

DATED : August 22, 1989

INVENTOR(S) : McCubbrey et al.

It is certified that error appears in the above-identified patent and that said Letters Patent is hereby corrected as shown below:

Column 4, line 42, "component is" should be --components--.

Column 14, line 6, "image" should be --logic--.

Column 14, line 37, "4,398,176; and 4,442,543" should be --4,398,176; 4,442,543--.

Column 14, line 37, after 4,442,543, insert --4,464,788; 4,464,789; 4,484,346; 4,590,607; and 4,541,116--.

Column 14, line 37, delete --and by referring to U.S. Patent Application Ser. Nos. 300,328; 378,358; 489,669; 419,259; and 583,662--.

Column 16, line 37, "$A \geq$" should be --$A \leq B$--.

Column 17, line 16, "but" should be --bus--.

UNITED STATES PATENT AND TRADEMARK OFFICE
CERTIFICATE OF CORRECTION

PATENT NO. : 4,860,375

DATED : August 22, 1989

INVENTOR(S) : Mc Cubbrey, et al

It is certified that error appears in the above-identified patent and that said Letters Patent is hereby corrected as shown below:

Column 18, line 4, "iamge" should be --image--.

Column 18, line 10, "in" should be --is--.

Signed and Sealed this

Sixth Day of November, 1990

*Attest:*

HARRY F. MANBECK, JR.

*Attesting Officer*    Commissioner of Patents and Trademarks